Aug. 17, 1926.  1,595,997
S. COCANARI
OPTICAL APPARATUS CONTAINING FILMS
Filed April 1, 1926   2 Sheets-Sheet 2
Fig.6   Fig.7   Fig.4
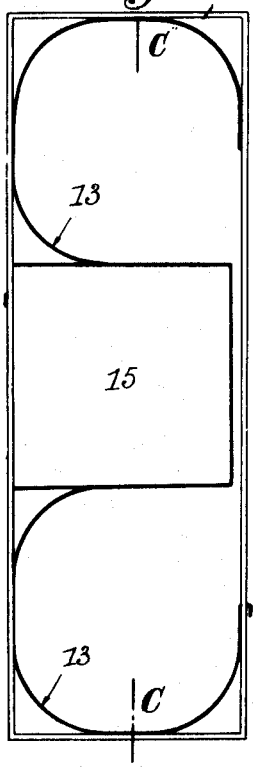
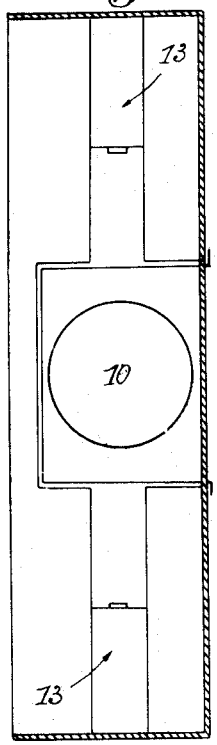
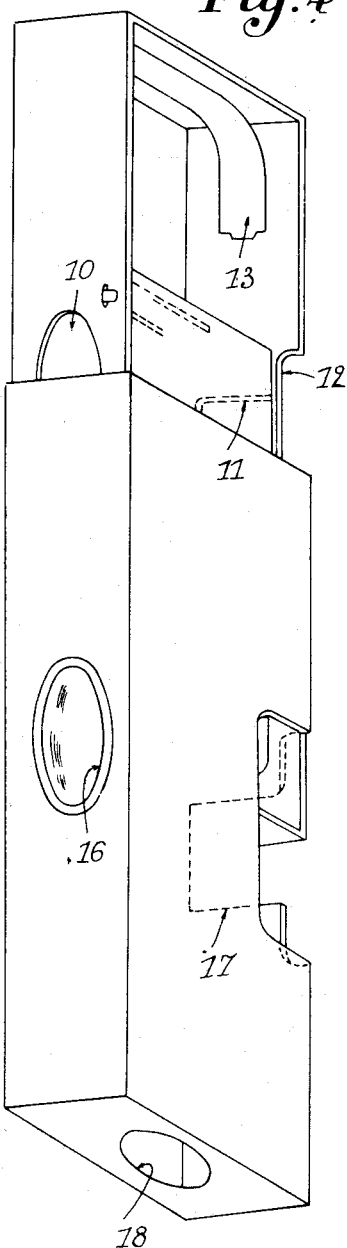
Fig.5
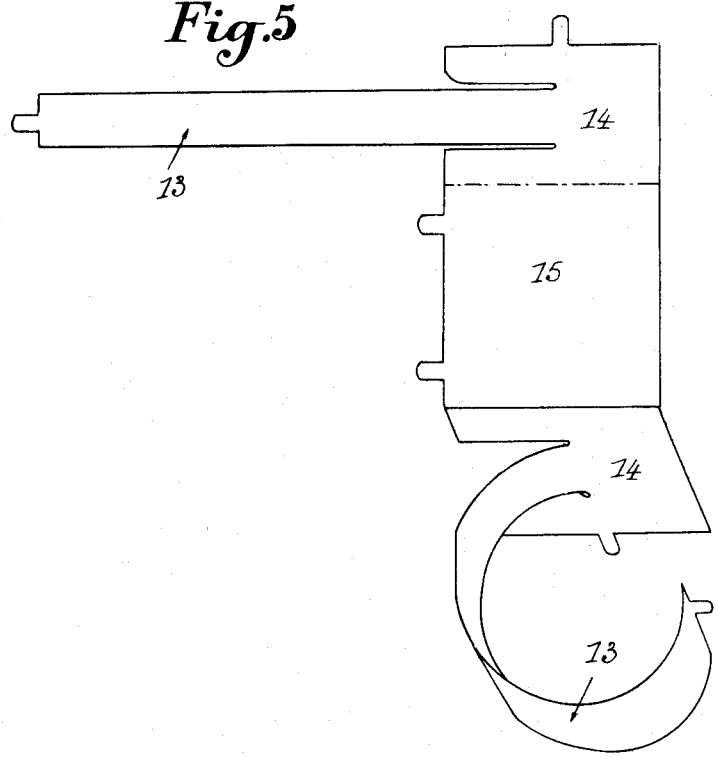
Silvio Cocanari
INVENTOR
his ATTY.

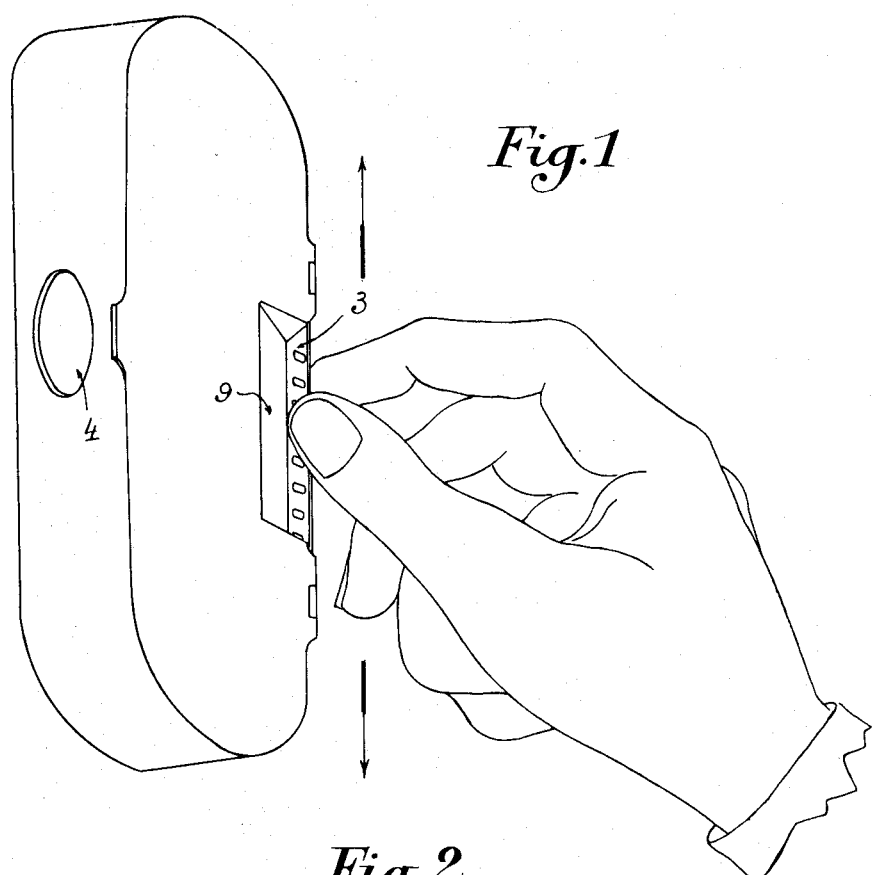
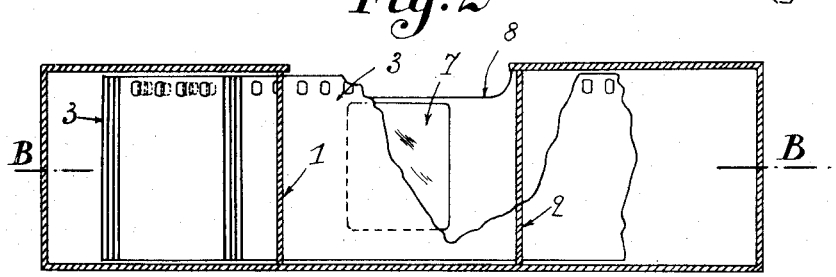
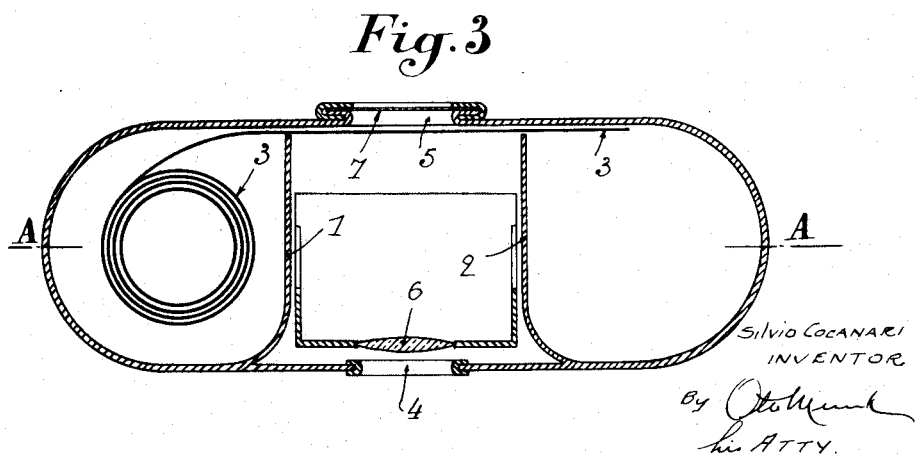

Patented Aug. 17, 1926.

1,595,997

UNITED STATES PATENT OFFICE.

SILVIO COCANARI, OF ROME, ITALY, ASSIGNOR TO PATHÈ CINÉMA ANCIENS ÉTABLISSEMENTS PATHÈ FRERES, OF PARIS, FRANCE.

OPTICAL APPARATUS CONTAINING FILMS.

Application filed April 1, 1926, Serial No. 98,973, and in France April 10, 1925.

The present invention relates to an optical apparatus containing a film or a band of images, preferably analogous to a cinematographic film, the said apparatus being characterized in that the box containing the film or band is so arranged that the edge of the film may be seized by the fingers in order to draw it forward for the taking of views or for the examination or the screen projection of the successive images.

By the said disposition we provide a simple and inexpensive device in which all actuating parts such as rollers or the like are dispensed with.

Further characteristics of the invention will be set forth in the following description.

In the appended drawing which is given by way of example:

Fig. 1 is a perspective view of our said apparatus, in the closed state.

Fig. 2 is a section of the apparatus on the line II—II of Fig. 3.

Fig. 3 is a section of the apparatus on the line III—III of Fig. 2.

Fig 4 is a perspective view of a second form of construction which is suitable for a very inexpensive device.

Fig. 5 shows a metallic fitting, partially bent into shape.

Fig. 6 is a plan view of the inner box of the said apparatus, provided with the metallic fitting.

Fig. 7 is a section on the line VII—VII of Fig. 6.

The apparatus shown in Figs. 1, 2 and 3 comprises a box A which is subdivided into three spaces or chambers by the partitions 1 and 2. In the two end chambers is wound the film 3 carrying the images to be observed. Said film passes into the free spaces $b^1$, $b^2$ between the bottom $a^2$ of the box A and the edges of the partitions 1 and 2. The central chamber, apertured at 4 and 5, is provided with a lens 6 disposed rearwardly of the aperture 4, and with a ground glass member 7 adjacent the aperture 5 before which the film 3 travels.

The said box is cut out at 8 adjacent the embossed or pressed part 9 of the cover $a^1$ of the apparatus. Due to this arrangement, when the apparatus is closed the outer edge of the film can be seized by the fingers and the film can be thus drawn in either direction in order to examine the images or to project them upon the screen.

Figs. 4, 5, 6 and 7 relate to an apparatus in which an inexpensive construction is a leading feature.

The said apparatus comprises an outer casing B and an inner box C containing the film; said box is made from a sheet of cardboard or the like which is suitably cut out, bent into shape and secured by adhesion. The said box is provided with a bottom 20 and is apertured at 10 adjacent the objective or the lens. When the apparatus is intended for direct viewing or for projecting images, the box C is also apertured at 11, this opening being covered by a ground glass plate or a sheet of roughened celluloid. The box C is cut out at 12 so as to show one of the edges of the said film.

The said box C is divided into three spaces or chambers by a metallic or like element or fitting, analogous to what is shown in Fig. 5. The said element comprises two parts 13 of circular shape which are disposed in the box (Figs. 4, 6 and 7) so as to form rounded angles whereby the film may more readily travel. The parts 14 of said element serve to divide the box into three chambers, and the part 15 provides light tight conditions for the middle space or dark chamber. The height of the dark chamber formed by the part 15 of the said metallic element together with the wall of the box is such that the edge of the film which is adapted to be seized as above stated will extend to a sufficient degree from the said dark chamber.

The box C comprising the said metallic element, is slid into an outer casing B which is constructed by means of a sheet of cardboard, suitably shaped and pasted together. The said casing is apertured at 16 and into the aperture is fitted an objective or an enlarging lens, in coincidence with the aperture 10 in the box. When the apparatus is intended for direct viewing or for projecting of images, the said casing B is further apertured at 17 in coincidence with the aperture 11 and the notch 12 in the said box. Due to the opening 18, the box can be readily pushed out of its casing when the film is to be removed or replaced.

Obviously, the said invention is not limited to the constructions hereinbefore set forth by way of example, these being susceptible of various modifications in detail without departing from the spirit of the invention.

Having now described my invention, what I claim as new and desire to secure by Letters Patent is:

1. In an optical apparatus containing a film, a box, a film in said box adapted to travel along one edge of said box, and a notch along said edge of said box adapted to allow the seizing of the film from the outside with the fingers for drawing it along.

2. In an optical apparatus containing a film, a box, a film in said box adapted to travel along one edge of said box, a notch along said edge in one wall of said box adapted to allow the seizing of the film from the outside with the fingers for drawing it along and a part of the wall adjacent to the notched wall folded near the edge of said notch.

3. In an optical apparatus containing a film, a casing open at one end, an aperture along one longitudinal edge of said casing, a box adapted to be inserted by sliding into said casing through its open end, a notch along one longitudinal edge of said box in coincidence with the aperture in said casing and a film in said box adapted to travel along the notched edge of said box to allow the seizing of the film from the outside with the fingers for drawing it along.

4. In an optical apparatus containing a film, a casing open at one end, an aperture along one longitudinal edge of said casing, a box adapted to be inserted by sliding into said casing through its open end, a notch along one longitudinal edge of said box in coincidence with the aperture in said casing, a metallic fitting adapted to divide said box into a central compartment for the optical members and two end compartments respectively for the winding and the unwinding of the film and a film in said box adapted to travel along the notched edge of said box from one end compartment to the other end compartment to allow the seizing of the film from the outside with the fingers for drawing it along.

5. In an optical apparatus containing a film, a casing open at one end, an aperture along one longitudinal edge of said casing, a box adapted to be inserted by sliding into said casing through its open end, a notch along one longitudinal edge of said box in coincidence with the aperture in said casing, a metallic fitting adapted to divide said box into a central compartment for the optical members and two end compartments respectively for the winding and the unwinding of the film, said fitting comprising a metallic sheet folded along two parallel lines into three parts, the central part being at right angles with the two end parts so as to limit with a lateral wall of the box the central compartment, two curved strips parallel to said folding lines projecting from said end parts so as to form rounded corners in the end compartments and a film in said box adapted to travel along the notched edge of said box from one end compartment to the other end compartment to allow the seizing of the film from the outside with the fingers for drawing it along.

In testimony whereof I have signed my name to this specification.

SILVIO COCANARI.